(12) United States Patent
Blenkhorn et al.

(10) Patent No.: US 8,192,830 B2
(45) Date of Patent: Jun. 5, 2012

(54) MATERIALS HAVING A TEXTURED SURFACE AND METHODS FOR PRODUCING SAME

(75) Inventors: Gary P. Blenkhorn, Cape Elizabeth, ME (US); Dieter Doehring, Dresden (DE)

(73) Assignee: S.D. Warren Company, Boston, MA (US)

( * ) Notice: Subject to any disclaimer, the term of this patent is extended or adjusted under 35 U.S.C. 154(b) by 0 days.

(21) Appl. No.: 13/087,179

(22) Filed: Apr. 14, 2011

(65) Prior Publication Data

US 2011/0186712 A1    Aug. 4, 2011

Related U.S. Application Data

(62) Division of application No. 11/742,257, filed on Apr. 30, 2007, now Pat. No. 7,964,243.

(51) Int. Cl.
*B32B 3/00* (2006.01)
*B32B 7/06* (2006.01)

(52) U.S. Cl. ......... 428/156; 428/141; 428/202; 428/204

(58) Field of Classification Search .......... 428/202, 428/203, 204, 41.8, 42.1, 156, 187, 141
See application file for complete search history.

(56) References Cited

U.S. PATENT DOCUMENTS

| | | |
|---|---|---|
| 2,463,370 A | 3/1949 | Flaster |
| 3,098,438 A | 7/1963 | Freund |
| 3,682,738 A | 9/1969 | Smith |
| 3,573,136 A | 3/1971 | Gardner |
| 3,814,647 A | 6/1974 | Scher et al. |
| 4,112,189 A | 9/1978 | Terwilliger |
| 4,138,945 A | 2/1979 | Rejto |
| 4,289,821 A | 9/1981 | Gray et al. |
| 4,322,450 A * | 3/1982 | Gray et al. ............... 427/504 |
| 4,327,121 A | 4/1982 | Gray |
| 4,388,137 A | 6/1983 | McCarty et al. |
| 4,546,065 A | 10/1985 | Amendola et al. |
| 4,560,578 A | 12/1985 | Freeman |
| 4,740,258 A | 4/1988 | Breitscheidel |
| 5,116,548 A | 5/1992 | Mallik et al. |
| 5,874,145 A | 2/1999 | Waller |
| 5,992,320 A | 11/1999 | Kosaka et al. |
| 6,110,317 A | 8/2000 | Sandor |
| 6,207,003 B1 | 3/2001 | McClure et al. |
| 6,238,750 B1 | 5/2001 | Correll et al. |
| 6,272,275 B1 | 8/2001 | Cortright et al. |

(Continued)

FOREIGN PATENT DOCUMENTS

DE    196 49 116    5/1998

(Continued)

OTHER PUBLICATIONS

PCT International Search Report and Written Opinion from PCT/US2008/061487 dated Jul. 11 2008.

(Continued)

*Primary Examiner* — Catherine A Simone
(74) *Attorney, Agent, or Firm* — Fish & Richardson P.C.

(57) ABSTRACT

The present disclosure features processes and equipment for forming a variety of textured materials, including both release webs, and finished products such as flooring materials, wall coverings, textured laminates and the like. The processes described herein allow curing radiation to be passed through a texturing medium, rather than through the substrate to which the curable material is applied.

11 Claims, 4 Drawing Sheets

U.S. PATENT DOCUMENTS

| | | |
|---|---|---|
| 6,355,343 B1 | 3/2002 | Glassock |
| 6,406,585 B1 | 6/2002 | Taubert |
| 6,635,202 B1 | 10/2003 | Bugg et al. |
| 6,861,024 B2 | 3/2005 | Glassock |
| 7,018,680 B2 | 3/2006 | Kasma et al. |
| 2004/0028834 A1 | 2/2004 | Dove et al. |
| 2004/0142181 A1 | 7/2004 | Marsella et al. |
| 2005/0123678 A1 | 6/2005 | Maijala et al. |
| 2006/0130421 A1 | 6/2006 | Nollet et al. |
| 2006/0144004 A1 | 7/2006 | Nollet et al. |
| 2008/0268203 A1 | 10/2008 | Blenkhorn |

FOREIGN PATENT DOCUMENTS

| | | |
|---|---|---|
| DE | 102005006084 | 8/2006 |
| EP | 0 065 043 | 11/1982 |
| EP | 148611 A2 | 7/1985 |
| EP | 1363770 | 10/2006 |
| EP | 2 025 413 | 2/2009 |
| GB | 1 392 920 | 5/1975 |
| GB | 2 063 178 | 6/1981 |
| KR | 2003 0040695 | 5/2003 |
| WO | WO9015673 | 12/1990 |
| WO | WO 99/38680 | 8/1999 |
| WO | WO9961168 | 12/1999 |
| WO | WO 03/076083 | 9/2003 |
| WO | WO 03/076716 | 9/2003 |
| WO | WO 03/077371 | 9/2003 |
| WO | WO0374197 | 9/2003 |
| WO | WO0374198 | 9/2003 |
| WO | WO 2005108114 | 11/2005 |
| WO | WO 2007059805 | 5/2007 |

OTHER PUBLICATIONS

ROC Taiwan Search Report of Patent Application No. 097115807, dated Dec. 28, 2010, 9 pages (with translation).

Communication pursuant to Article 94(3) EPC, Application No. 08747079.5, Oct. 11, 2010, 7 pages.

Basf Handbook on Basics of Coating Technology, pp. 723-727, 2003.

* cited by examiner

MATERIALS HAVING A TEXTURED SURFACE AND METHODS FOR PRODUCING SAME

CROSS-REFERENCE TO RELATED APPLICATIONS

This application claims priority under 35 U.S.C. §121 to U.S. application Ser. No. 11/742,257 titled "Materials Having a Textured Surface and Methods for Producing Same" filed Apr. 30, 2007, now U.S. Pat. No. 7,964,243, the disclosure of which is incorporated herein by reference in its entirety.

TECHNICAL FIELD

This invention relates to materials having a textured surface and to methods for producing such products.

BACKGROUND

Surface textures, e.g., three-dimensional patterns, may be imparted to sheet or web materials by a process in which a web is coated with a curable coating, a texture is imparted to the curable coating by a replicative surface in the form of an engraved metal roll, and the coating is cured while in contact with the roll by passing radiation through the web. If the web is transparent, the coating may be cured using ultraviolet (UV) radiation, while if it is opaque electron beam radiation is generally used. Substrates (webs) that can be used with this type of process are limited to those which are thin enough to be penetrated by the radiation, and, in the case of opaque substrates, capable of withstanding treatment with electron beam radiation. In some cases, release from the embossed roll is problematic, and/or there may be problems with the coating quality, e.g., air entrapment or streaking.

The sheet or web materials resulting from this process may be used as release sheets or films in processes in which a plastic film or sheet is formed on or against a release sheet and then separated from the release sheet after cooling or curing to set the plastic material. The release sheet provides a surface from which the set plastic material can be readily separated and imparts to the surface of the plastic material the quality of finish of the release surface. For example, a desired textured surface can be provided on the surface of the plastic material by forming the plastic material on or against a release sheet having a textured surface that is the mirror image of the desired textured surface.

One example of such a forming process is "casting," a process in which a resinous material, such as polyvinyl chloride or polyurethane resin, in a flowable state, is deposited or "cast" onto the release sheet surface, heated, cured and cooled to consolidate the resinous material into a continuous self-supporting film, and stripped from the release sheet. The release sheet is normally provided with a desired surface effect, such as high gloss, texturing or an embossed configuration, and the surface effect is replicated on the cast film.

U.S. Pat. No. 4,289,821 (Gray et al.) and U.S. Pat. No. 4,322,450 (Gray et al.), the disclosures of which are incorporated herein by reference, disclose techniques for producing surface effects in a release coating on a release sheet for use in casting processes. One method disclosed comprises applying a coating of an electron beam radiation curable material to one surface of a web substrate, pressing the coated side of the substrate against a replicative surface (an embossing medium) having the desired surface effect to cause the coating to conform to the replicative surface, irradiating the coating with electron beam radiation to cure the coating, and stripping the substrate from the replicative surface with the cured coating adhered to the substrate. The replicative surface is preferably a metal roll with either a pattern engraved in its surface or a highly polished smooth surface. An important advantage of this technique is that the pattern or finish of the replicative surface is reproduced in the cured coating with essentially 100% fidelity. This technique enables replication of very fine patterns, such as wood grain and leather grain, on the surface of a plastic cast onto the release sheet.

SUMMARY

The present disclosure features processes and equipment for forming materials that have a textured surface formed by applying a texture to a curable coating and then curing the coating. As used herein, the terms "texture" and "textured surface" include very fine textures, e.g., including textures having a topography below the wavelength of light. The textures discussed herein are, however, predetermined textures, i.e., textures that are intentionally imparted to a surface rather than merely the texture that is inherently present on any surface due to the natural topography of the surface, surface contamination, and the like.

The textured materials that may be thus formed include both release films for use in casting processes and finished products in sheet, board, plate or web form, e.g., flooring materials, wall coverings, textured laminates and the like. The processes described herein utilize a textured web, rather than an engraved roll, as the texturing medium, thus allowing curing radiation to be passed through the texturing medium rather than through the substrate which will bear the textured and cured coating.

Curing through the texturing medium provides a number of advantages. It allows thicker substrates to be utilized, such as foils, boards and plates, enabling production of a wider variety of finished products. It also reduces or eliminates damage to the substrate due to radiation exposure, and allows the use of substrates that could be damaged by such exposure, for example cellulosic substrates. Thus, in some implementations the substrate, after the coating has been cured, exhibits virtually no change in its mechanical properties (tensile and tear strength) relative to its mechanical properties prior to the curing process.

The processes disclosed herein also address some of the process control issues that may occur with the processes described above, e.g., release from the embossing medium, air entrapment and streaking, providing a consistently high quality finished product.

The use of a web-form texturing medium rather than an engraved roll provides a number of significant process advantages. For example, it is generally easier to change the texturing medium, e.g., to change textures, than it is to change an engraved roll. Moreover, since an engraved roll is used only occasionally (as a master for creating the texturing medium) if at all, problems with nicking and other damage to the engraved roll are minimized or eliminated and it is easier to maintain fidelity of replication of the texture. In addition, it is generally easier to coat a web-form texturing medium than it is to coat an engraved roll, and thus the process can be run at higher speeds without air entrapment in the coating.

In one aspect, the invention features a method of manufacturing a material having a textured surface, the method comprising: (a) providing a texturing medium including a flexible web and a surface layer having a three-dimensional texture defining a replicative surface, (b) providing a substrate to which a textured surface is to be applied, (c) coating the replicative surface and/or the substrate with a curable coating, (d) contacting the substrate with the texturing medium such that the coating is sandwiched between the substrate and texturing medium, (e) curing the coating, and (f) stripping the texturing medium from the substrate such that the cured coating remains on the substrate.

Some implementations include one or more of the following features.

The curing step may comprise delivering radiation, e.g., UV or electron beam radiation, through the texturing medium. The radiation is preferably applied on the side of the texturing medium.

The step of providing a texturing medium may comprise applying a curable coating to the flexible web, imparting a texture to the coating and curing the coating to form the surface layer. When forming the texturing medium, the texture may be imparted to the coating on the flexible web using a roll engraved with a replicative pattern, or alternatively the texture may be applied to the coating on the flexible web using a master texturing medium (a texturing medium that itself comprises a flexible web and a textured cured coating).

The texturing medium may comprise a continuous web. In this case, the method may further include drawing the texturing medium from a supply roll to a take up roll during the coating, curing and stripping steps. The applying step may comprise passing the coated texturing medium and the substrate through a nip. The texturing medium may comprise, for example, a paper or film web.

The substrate may comprise a polymer film, a plurality of discrete boards or plates, or any other desired substrate material. The substrate is generally in the form of a web, sheet, plate or board material.

The coating may include a release agent selected to allow the cured coating to act as a release layer during a subsequent casting process.

Preferably the coating is a 100% solids coating, minimizing or eliminating shrinkage of the coating during curing and thereby preserving the fidelity of replication of the surface texture from the texturing medium to the coating. In preferred implementations, the inverse of the texture of the replicative surface is reproduced in the cured coating with 100% fidelity. In implementations in which an engraved roll is initially used to produce the texturing medium, it is preferred that the replicative pattern of the engraved roll be reproduced in the cured coating with 100% fidelity.

Advantageously, the texturing medium is generally re-usable over multiple processing runs. Thus, in some implementations the method will further include transferring the take-up roll onto which the used texturing medium is wound to the supply roll position and re-using the texturing medium.

In another aspect, the invention features a textured product comprising a substrate in sheet, board or web form; and on an exposed surface of the product, a cured radiation curable coating having a three dimensional surface texture. Importantly, the physical properties (tensile strength and tear strength) of the substrate are substantially the same as the physical properties of the substrate prior to application and curing of the coating. This significant advantage is obtained by delivering radiation to the radiation curable coating, during manufacture, through a texturing medium rather than through the substrate.

Some implementations may include one or more of the following features. The substrate may bear a graphic pattern, e.g., a pattern printed on the substrate underlying the cured coating. In some implementations, the pattern is in registration with the surface texture. The substrate may in some cases comprise a board. The substrate may carry an adhesive on a surface of the substrate opposite the exposed surface, for example if the product comprises a wallcovering or flooring material. In some cases, the cured coating includes a release agent selected to allow the cured coating to act as a release layer during a casting process.

The details of one or more embodiments of the invention are set forth in the accompanying drawings and the description below. Other features and advantages of the invention will be apparent from the description and drawings, and from the claims.

DETAILED DESCRIPTION

Overview

In the following description, we will first describe how the texturing processes disclosed herein may be used to manufacture release webs, i.e., web or sheet materials that may be used in the casting processes described above in the Background section or in other processes such as pressing, laminating, vulcanizing and roll curing. For example, a release web manufactured in this manner can subsequently be used as a mold to cast a finished product that has a desired surface texture that is the inverse of the texture on the release film. Next, we will describe how the processes disclosed herein can be used to directly form a finished product that comprises a substrate, and, on an exposed surface of the substrate, a cured coating having a surface texture that is the inverse of the texture on the texturing medium. Finally, we will describe preferred manners by which the texturing medium used in the processes disclosed herein can be manufactured.

Manufacturing Release Webs

Figure 1:
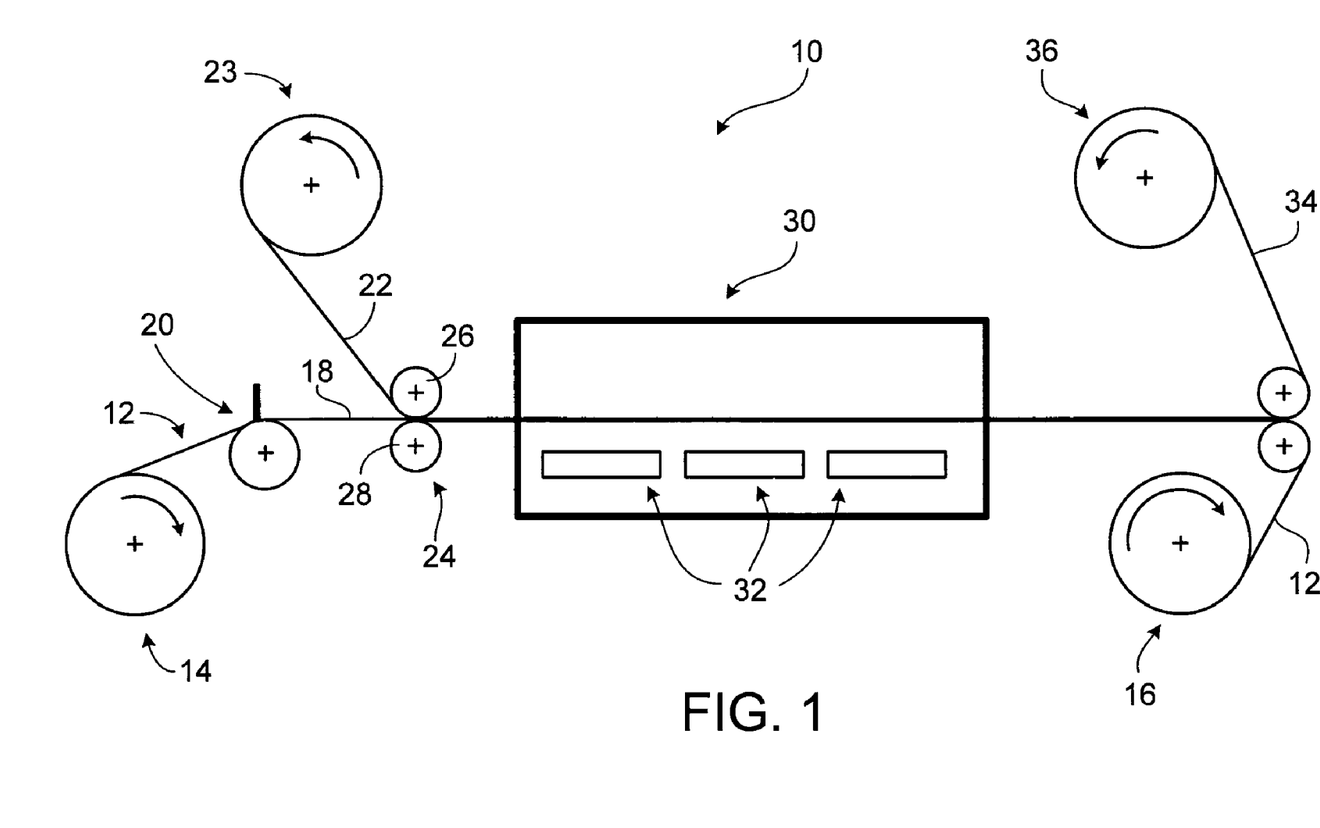
FIG. 1 is a diagrammatic side view of a process for manufacturing a textured release film.

Referring to FIG. 1, a machine 10 for manufacturing release web material includes a textured web 12 that is delivered from a supply roll 14 and wound up on a take up roll 16. The textured web 12 provides the replicative surface 18 against which the substrate for the release web is nipped. A curable coating is applied to surface 18 at a coating station 20. The textured web and curable coating are selected so that the curable coating, when cured, will release from the textured web.

The substrate 22 is delivered from a supply roll 23, and enters the machine at nip 24, between nip rolls 26, 28. The nip adheres the coated surface of the textured web 12 to the facing surface of the substrate 22. The thus-formed sandwich then travels through a curing station 30 which includes radiation delivery devices 32, e.g., UV lamps.

If the substrate is opaque, or if desired, the radiation delivery devices may deliver electron beam radiation rather than ultraviolet light. The radiation delivery devices are preferably positioned as shown, on the side of the textured web 12, rather than on the side of the substrate 22. As a result, the radiation does not need to, and typically does not, penetrate the thickness of the substrate. Because the radiation does not pass through the substrate, the physical properties of the substrate are not deteriorated by curing.

After curing, the substrate carrying the cured coating (the finished release web 34) is stripped off of the textured web 12, with the cured coating remaining on substrate 22. The finished release web 34 is then wound up on a take-up roll 36. The textured web 12 is then wound up on the take up roll 16. Generally, the textured web may be re-used multiple times, e.g., more than 50 times and in some cases 70 times or more.

Manufacturing Finished Products

Figure 2:
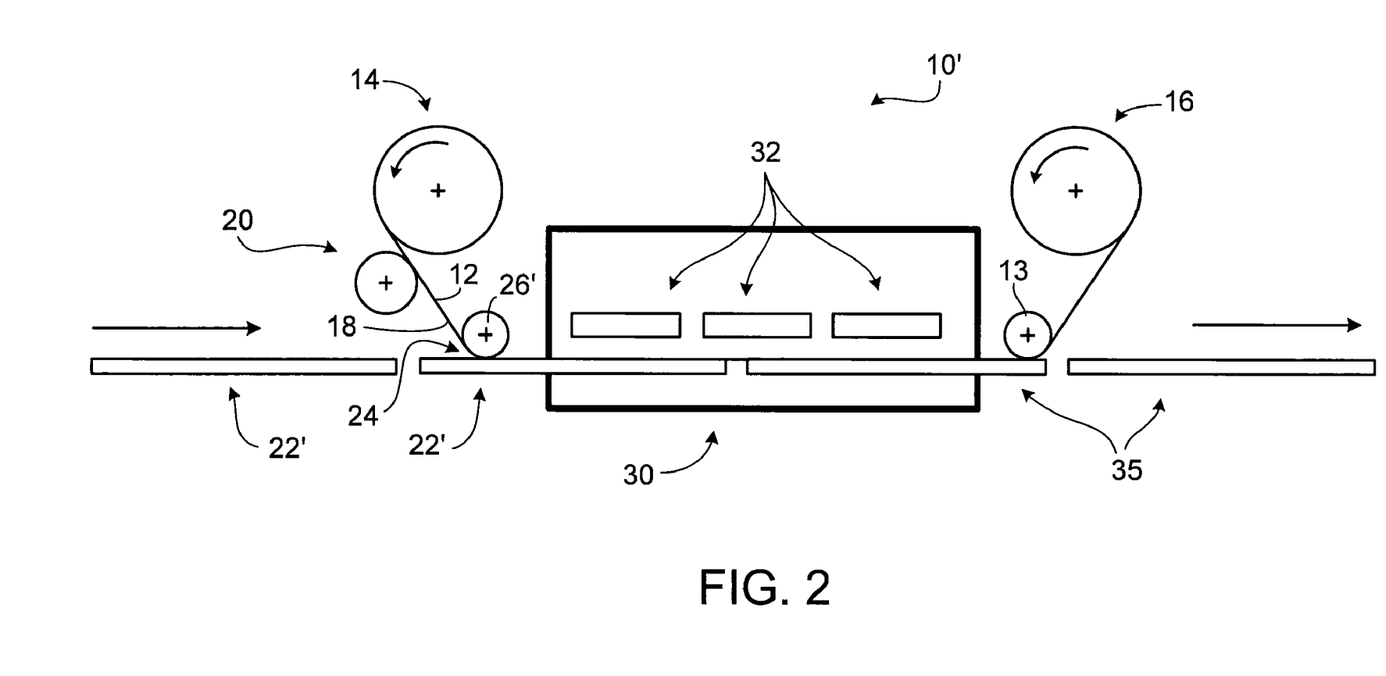
FIG. 2 is a diagrammatic side view of a process for manufacturing a laminated product.

Referring to FIG. 2, like the machine 10 described above, a machine 10' for manufacturing a finished product includes a textured web 12 that is delivered from a supply roll 14 and wound up on a take up roll 16. The textured web 12 provides the replicative surface 18 against which the substrate for the finished product is nipped. A curable coating is applied to surface 18 at a coating station 20. The textured web and curable coating are selected so that the curable coating, when cured, will release from the textured web.

The substrate 22', shown in FIG. 2 as a series of discrete boards, enters the machine at nip 24, where it is nipped against roll 26'. The boards are supported by a conveyor or series of rollers (not shown). The roll 26' presses the coated surface of the textured web 12 against the facing surface of the substrate 22'. The thus-formed sandwiches then travel through a curing station 30 which includes radiation delivery devices 32, e.g., UV lamps or electron beam delivery devices. In this case, unlike the machine 10 shown in FIG. 1, the radiation delivery devices are mounted above the sandwiches, and the texturing medium is above the substrate 22', so that the coating can be cured through the texturing medium while the boards are supported by the underlying conveyor or rollers.

After curing, the textured web 12 is stripped off of the substrate carrying the cured coating by passing the textured web 12 around a stripping roll 13. The cured, textured coating remains on substrate 22 defining the finished product 35. In the implementation shown in FIG. 2, the weight of the boards holds the boards against the conveyor or rollers during stripping. In other implementations other types of stripping techniques may be employed. The textured web 12 is wound up on the take up roll 16 and may be re-used multiple times, e.g., more than 50 times or 70 times or more.

If desired, the boards or other substrate 22' may carry a pre-printed graphic pattern. In this case, if it is desired that the graphic pattern be in-register with the texture of the textured coating, registration may be provided using registration marks on the substrate and texturing medium and registration techniques such as optical registration devices.

Advantageously, since curing is done from the textured web side, the substrate can be any desired material, for example cellulosic, ceramic, metal or textile materials, of any desired thickness. As a result, a wide variety of finished products can be manufactured using the process. In some implementations, if metal is used, the finished product may be a caul plate or an aluminum siding product, while if a flexible web is used the finished product may be a wallcovering.

Manufacturing the Texturing Medium

In some implementations, the texturing medium (e.g., textured web 12 in FIG. 1) is formed by a method that includes coating a curable liquid onto a substrate, imparting a pattern to the coating, e.g., by a mold roll, curing the coating, and stripping the substrate and cured coating from the pattern-imparting surface.

Figure 4:
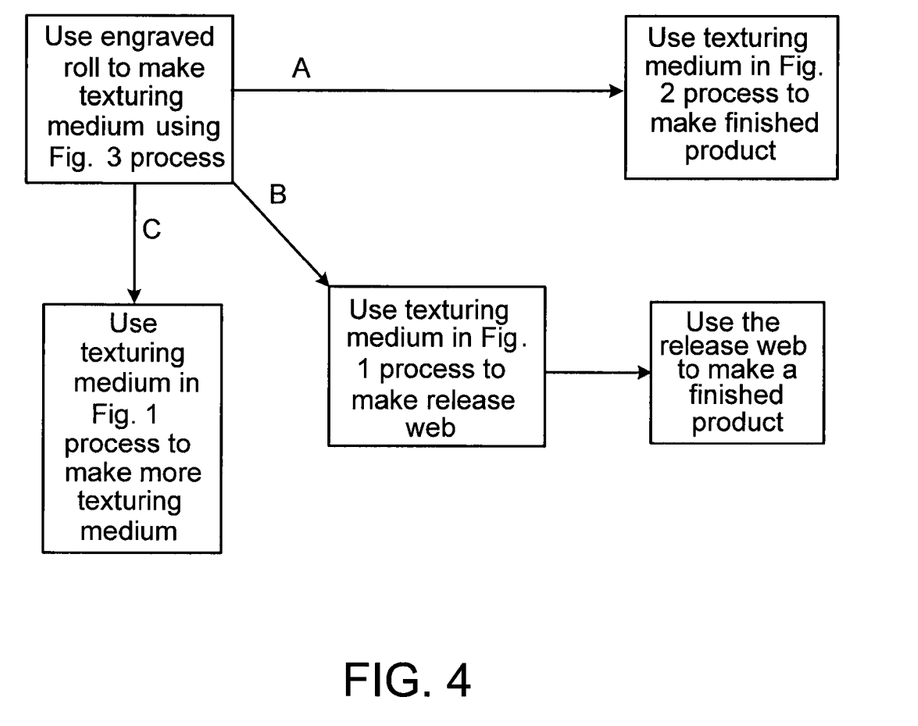
FIG. 4 is a diagram showing different options for use of the processes shown in FIGS. 1-3.

In the process shown in FIG. 2, the pattern on the texturing medium is the reverse of the desired texture of the finished product, and thus in this case (option A in FIG. 4) the pattern on the engraved mold roll will be identical to the pattern which will appear on the finished product. In the process shown in FIG. 1, the texture of the finished, cast product (see option B in FIG. 4) will be the inverse of the release web, and thus the pattern on the engraved mold roll will be the inverse of the pattern desired in the finished cast product and pattern on the texturing medium will be the same as the desired pattern on the finished product.

Figure 3:
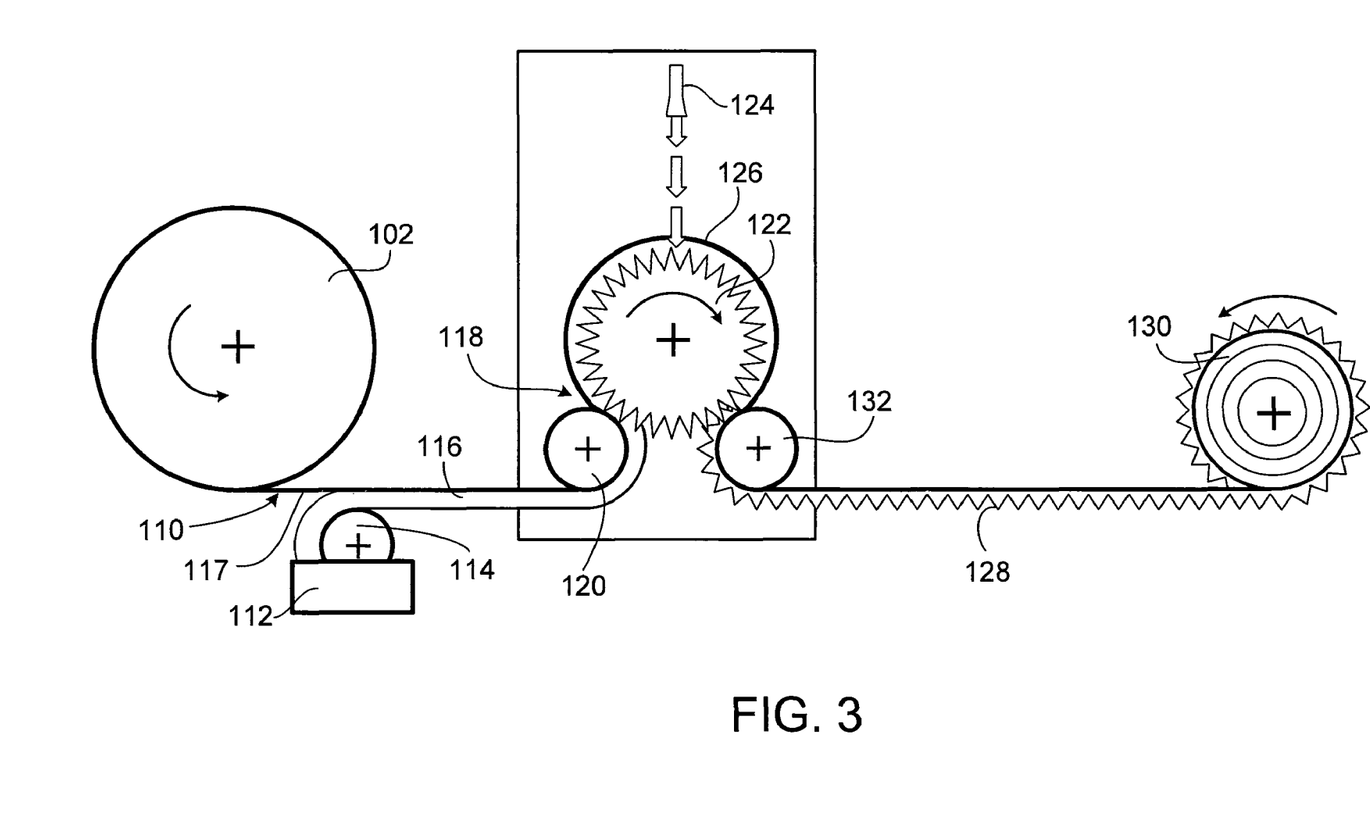
FIG. 3 is a diagrammatic side view of a process for manufacturing a texturing medium.

Preferably, the entire process for forming the texturing medium using an engraved roll is conducted on a continuous web of material which is drawn through a series of processing stations, e.g., as shown diagrammatically in FIG. 3. The process illustrated in FIG. 3 will result in very high fidelity, e.g., substantially 100% fidelity, replication of the desired pattern, which will be perpetuated in the products manufactured using the texturing medium.

Referring to FIG. 3, in one process a web 110, e.g., a polymeric film, first passes from a supply roll 102 to a coating station 112 at which a coating head 114 applies a wet coating 116 to a surface 117 of the web. Next, the coated web passes through a nip 118 between a backing roll 120 and an engraved roll 122, with the wet coating 116 facing the engraved roll 122. The engraved roll carries a pattern on its surface, the inverse of which is imparted to the wet coating. Nip pressure is generally relatively low (e.g., "kiss" pressure), with the nip pressure being selected based on the viscosity of the coating to prevent the coating from being squeezed off of the web, while still allowing the engraved texture to be imparted to the coating. Typically, higher viscosity coatings and deeper patterns will require relatively higher nip pressures.

After leaving the nip, the coated and textured web passes through a curing station 124, e.g., an electron beam or UV curing device. The coating is cured while it is still in contact with the surface of the engraved roll. E-beam energy or actinic radiation is generally applied from the back surface 126 of the web and passes through the web and cures the coating 116 to form a hardened but flexible textured coating 128 that is firmly adhered to the web 110. The web 110 and cured coating 128 may be stripped off the engraved roll at take-off roll 132 and wound up on a take-up roll 130. If UV curing is used, the web should be transparent or translucent if curing is to be performed from the back surface of the web as shown.

The coating 116 may be applied using any suitable method. Suitable techniques include offset gravure, direct gravure, knife over roll, curtain coating, and other printing and coating techniques.

The engraved roll is one example of a replicative surface that may be used to impart the pattern to the wet coating. Other types of pattern-imparting devices may be used. It is generally preferred, however, that the replicative surface be disposed on a rotating endless surface such as a roll, drum, or other cylindrical surface. The coating can be applied directly to the web, before the substrate contacts the roll, as shown in FIG. 3, or alternatively the coating can be applied directly to the roll, in which case the substrate is pressed against the coated roll.

The coating may be cured by thermal curing, or preferably by radiation curing (e.g., electron beam radiation or UV radiation). Electron beam radiation is preferred in some cases because it can penetrate the thick coatings required for certain desired patterns. Electron beam radiation units are readily available and typically consist of a transformer capable of stepping up line voltage and an electron accelerator. Manufacturers of electron beam radiation units include Energy Sciences, Inc. and PCT Engineered Systems, LLC, Davenport, Iowa. Suitable UV curing devices are commonly available, e.g., from Fusion, Inc., Gaithersburg, Md.

Coating and substrate materials will be discussed below in the "Materials" section.

Other methods may be used to provide the texturing medium. For example, the texturing medium may be formed using the process shown in FIG. 1, with the textured web 12 having the inverse of the pattern that is desired for the new texturing medium (option C in FIG. 4). In this case, the textured web 12 acts as a "master" texturing medium. The texturing medium may also be manufactured using traditional embossing techniques.

Materials

The substrate 22 utilized in the process shown in FIG. 1 may be any desired sheet or web form material to which the curable coating will adhere, e.g., a paper or film. Polymeric films to which the coating would not normally adhere can be treated, e.g., by flame treatment, corona discharge, or pre-coating with an adhesion promoter. Suitable substrates include paper, polyester films, and films of cellulose triacetate, biaxially oriented polystyrene and acrylics. Substrates suitable for use in the process shown in FIG. 2 include these substrates and others as discussed above.

The curable coatings referred to above preferably include an acrylated oligomer, a monofunctional monomer, and a multifunctional monomer for crosslinking. If ultraviolet radiation is used to cure the acrylic functional coating, the coating will also include a photoinitiator as is well known in the art. Preferred acrylated oligomers include acrylated urethanes, epoxies, polyesters, acrylics and silicones. The oligomer contributes substantially to the final properties of the coating. Practitioners skilled in the art are aware of how to select the appropriate oligomer(s) to achieve the desired final properties. Desired final properties for the release webs described herein typically require an oligomer which provides flexibility and durability. A wide range of acrylated oligomers are commercially available from Cytec Surface Specialties Corporation, such as Ebecryl 6700, 4827, 3200, 1701, and 80, and Sartomer Company, Inc., such as CN-120, CN-999 and CN-2920.

Typical monofunctional monomers include acrylic acid, N-vinylpyrrolidone, (ethoxyethoxy)ethyl acrylate, or isodecyl acrylate. Preferably the monofunctional monomer is isodecyl acrylate. The monofunctional monomer acts as a diluent, i.e., lowers the viscosity of the coating, and increases flexibility of the coating. Examples of monofunctional monomers include SR-395 and SR-440, available from Sartomer Company, Inc., and Ebecryl 111 and ODA-N (octyl/decyl acrylate), available from Cytec Surface Specialties Corporation.

Commonly used multifunctional monomers for crosslinking purposes are trimethylolpropane triacrylate (TMPTA), propoxylated glyceryl triacrylate (PGTA), tripropylene glycol diacrylate (TPGDA), and dipropylene glycol diacrylate (DPGDA). Preferably the multifunctional monomer is selected from a group consisting of TMPTA, TPGDA, and mixtures thereof. The preferred multifunctional monomer acts as a crosslinker. Examples of multifunctional monomers include SR-9020, SR-351, SR-9003 and SR-9209, manufactured by Sartomer Company, Inc., and TMPTA-N, OTA-480 and DPGDA, manufactured by Cytec Surface Specialties Corporation.

Preferably, the coating comprises, before curing, 20-50% of the acrylated oligomer, 15-35% of the monofunctional monomer, and 20-50% of the multifunctional monomer. The formulation of the coating will depend on the final targeted viscosity and the desired physical properties of the cured coating. In some implementations, the preferred viscosity is 0.2 to 5 Pascal seconds, more preferably 0.3 to 1 Pascal seconds, measured at room temperature (21-24° C.).

The coating composition may also include other ingredients such as opacifying agents, colorants, slip/spread agents and anti-static or anti-abrasive additives. The opacity of the coating may be varied, for example by the addition of various pigments such as titanium dioxide, barium sulfate and calcium carbonate, addition of hollow or solid glass beads, or addition of an incompatible liquid such as water. The degree of opacity can be adjusted by varying the amount of the additive used.

As mentioned above, a photoinitiator or photoinitiator package may be included if the coating is to be UV cured. A suitable photoinitiator is available from the Sartomer Company under the tradename KTO-46™. The photoinitiator may be included at a level of, for example, 0.5-2%.

If the process is used to form a finished product rather than a release web, the coating does not need to provide release properties.

Other Embodiments

A number of embodiments of the invention have been described. Nevertheless, it will be understood that various modifications may be made without departing from the spirit and scope of the invention.

For example, if desired, rather than coating the textured web 12 in the processes shown in FIGS. 1 and 2, the substrate 22 or 22' can be coated prior to introduction into the nip.

Moreover, in some implementations thermal curing may be used rather than radiation curing. In these cases, the curable material is a heat-curable material. The thermal energy is supplied from the side of the texturing medium, and may be for example infrared (IR) energy.

Accordingly, other embodiments are within the scope of the following claims.

What is claimed is:

1. A textured product comprising:
a substrate comprising a board or plate; and
on the substrate and forming an exposed surface of the product, a cured radiation curable coating having a three dimensional surface texture that reproduces an original three-dimensional pattern with 100% fidelity;
wherein the physical properties of the substrate, which has the cured radiation curable coating thereon, are substantially the same as the physical properties of the substrate prior to application and curing of the coating.

2. The textured product of claim 1, wherein the substrate bears a graphic pattern and the graphic pattern is in registration with the surface texture.

3. The textured product of claim 1 wherein the substrate carries an adhesive on a surface of the substrate opposite the exposed surface.

4. The textured product of claim 3 wherein the product comprises a wallcovering or flooring material.

5. The textured product of claim 1 wherein the cured coating includes a release agent selected to allow the cured coating to act as a release layer during a casting process.

6. The textured product of claim 1 wherein the substrate is a cellulosic substrate.

7. The textured product of claim 1 wherein the substrate is in the form of a metal plate.

8. The textured product of claim 1 wherein the substrate is in the form of a board that has a weight sufficient to allow the board to remain resting on conveyors or rollers as a textured web used to impart the three dimensional surface texture to the cured radiation curable coating is stripped from the cured radiation curable coating.

9. The textured product of claim 1 wherein the physical properties comprise tensile strength and tear strength.

10. A textured product comprising:

a substrate in sheet, board or web form; and on an exposed surface of the product, a cured radiation curable coating having a three dimensional surface texture that reproduces an original three-dimensional pattern with 100% fidelity;

wherein the physical properties of the substrate are substantially the same as the physical properties of the substrate prior to application and curing of the coating, and the substrate bears a graphic pattern and the graphic pattern is in registration with the surface texture.

11. A textured wallcovering or flooring material comprising:

a substrate in sheet, board or web form; and on an exposed surface of the product, a cured radiation curable coating having a three dimensional surface texture that reproduces an original three-dimensional pattern with 100% fidelity;

wherein the physical properties of the substrate are substantially the same as the physical properties of the substrate prior to application and curing of the coating, and the substrate carries an adhesive on a surface of the substrate opposite the exposed surface.

* * * * *